Patented Sept. 14, 1954

2,689,023

UNITED STATES PATENT OFFICE 2,689,023

CONTROL OF ELECTRICALLY OPERATED HOISTS AND WINDERS

John Wesley Mulligan, Stretford, and Owen Thomas Evans, Sale, England, assignors to Metropolitan-Vickers Electrical Company Limited, London, England, a British company Application November 4, 1952, Serial No. 318,602

6 Claims. (Cl. 187—29)

This invention relates to the control, particularly the braking, of electrically operated hoists and winders. It is well known to use a liquid controller for regulating the speed of the alternating current electric driving motor and to introduce some form of servo mechanism between the driver's control lever and the controller so that the position of the movable parts thereof may be adjusted without appreciable effort. When driving, it is desirable in operation that the resistance of the controller may be decreased rapidly to a value giving maximum driving torque and thereafter more slowly over the remaining part of the range, and it is customary to arrange for this to be effected automatically by the servo mechanism even though the driver's control lever is at once moved to the fully "on" position. A similar type of control is desirable when braking, but the existing type of servo mechanism cannot be used unaltered for this purpose since in the case of dynamic braking, the value of resistance which gives maximum braking torque is not constant but is dependent on the speed of the driving motor, so that, if during braking the servo mechanism merely introduces the lower speed of movement of the controller when the latter reaches the position giving a particular value of resistance, the control during braking will become less and less effective the lower the speed of the motor at which braking is initiated.

In dynamic braking it is well known that irrespective of the speed of operation of the motor, maximum braking torque is always obtained when the current in the rotor (and correspondingly the stator) reaches substantially the same value. In accordance with the present invention, therefore, the servo mechanism is controlled when braking so that its lower speed range of operation is introduced when the rotor current (or correspondingly the stator current) reaches a predetermined value, which value is preferably somewhat lower than that which corresponds to maximum braking torque.

In order that the invention may be clearly understood, it will now be described with reference to the accompanying drawings, in which.

Figure 1:
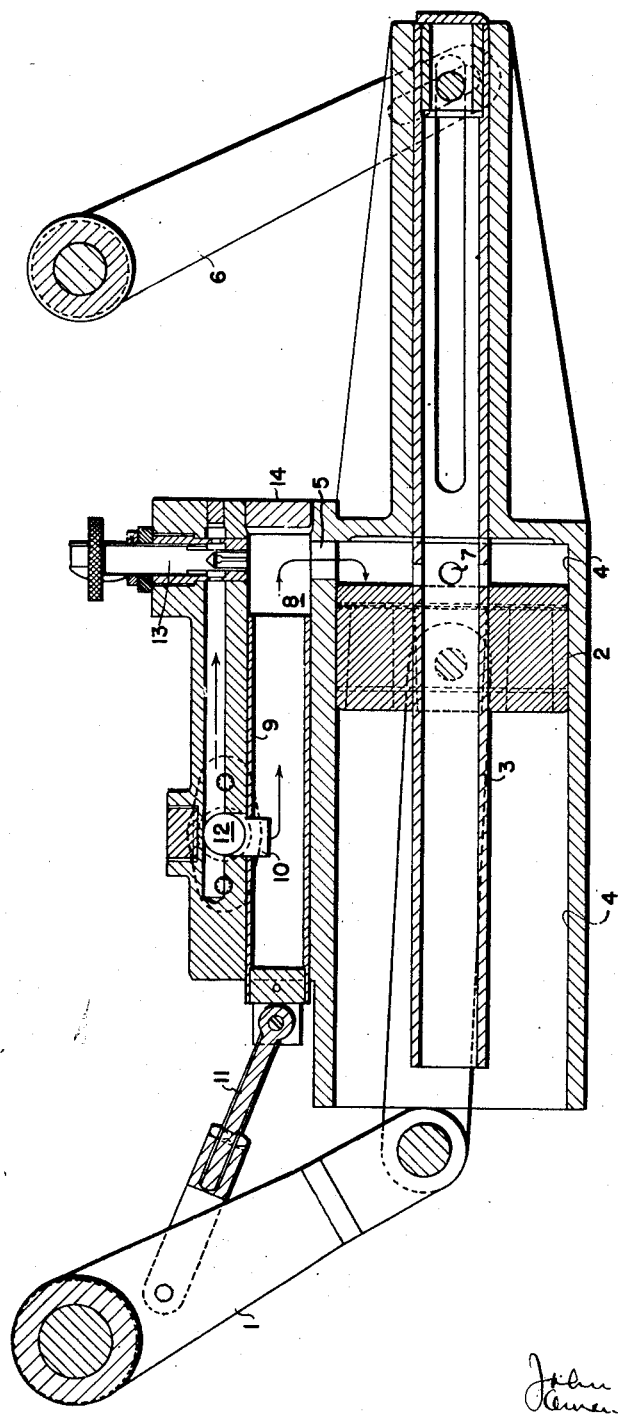
Fig. 1 shows in section the essential parts of a known form of servo-mechanism.

In the known form of fluid-operated servo-mechanism shown in Fig. 1, a lever 1 effective to control the position of the electrodes of a liquid controller, is operated by a piston 2 which is slidable on a hollow sleeve 3 within a cylinder 4 to one end of which oil under pressure is admitted through a port 5. The sleeve 3 which is movable with the driver's control lever by means of the lever 6 is formed with ports 7 so disposed that pressure fluid in the cylinder 4 will normally leak past the piston 2 by way of the ports and through the hollow sleeve 3. When, however, the driver's lever is moved, these ports 7 will be closed by the sleeve 3 moving into the piston 2 and the pressure fluid will then operate on the piston to move it, and with it the electrodes of the liquid controller, until the ports 7 are again uncovered, the operation of the device being accordingly in the nature of a simple positional control servo mechanism. Means is provided which, at some point in the travel of the piston 2 and sleeve 3 during driving, causes an appreciable reduction to occur in the effective area of the passage through which the pressure fluid is supplied to the cylinder 4 so that when this occurs the piston 2 can only be moved at a lower speed.

These means comprise a further cylinder 8 which is provided with a hollow sleeve 9 having a port 10 through which the pressure fluid flows to the interior of the sleeve and thence through the port 5 into the main cylinder 4. The sleeve is coupled with the lever 1 by means of a link 11 in such manner that when the lever 1 has moved a certain distance the movement of the sleeve 9 in the cylinder 8 causes the port 10 to be closed, and the pressure fluid entering at 12 can then reach the main cylinder 4 only by way of an adjustable orifice or metering valve 13. Under such conditions the rate of flow of the pressure fluid to the main cylinder 4 is very much reduced and accordingly the speed of movement of the piston 2 and lever 1 is correspondingly decreased.

With this arrangement and when dynamic braking is in operation, the invention provides that the rate of flow of the pressure fluid to the main cylinder 4 and hence the speed of movement of the lever 1 shall be reduced when the current in the rotor of the driving motor attains a predetermined value.

In one simple arrangement the valve comprising the sleeve and cylinder arrangement 8, 9 and the metering valve 13 are bypassed during dynamic braking by supplying pressure fluid to the cylinder 4, conveniently through the plug 14 which closes the end of the cylinder 8, through a pipe under the control of a power operated valve. This valve, which is arranged to be closed when driving but open when braking, is also so controlled that when braking it may be closed again when the rotor current reaches the predetermined value. In such arrangement it is assumed that when this occurs the position of the lever 1 will always be such that the port 10 in the sleeve and cylinder valve 8, 9 is closed so that the flow of pressure fluid will be restricted by the metering valve 13. The power operated valve is conveniently controlled electrically, for example as described below in connection with Fig. 3.

Figure 2:
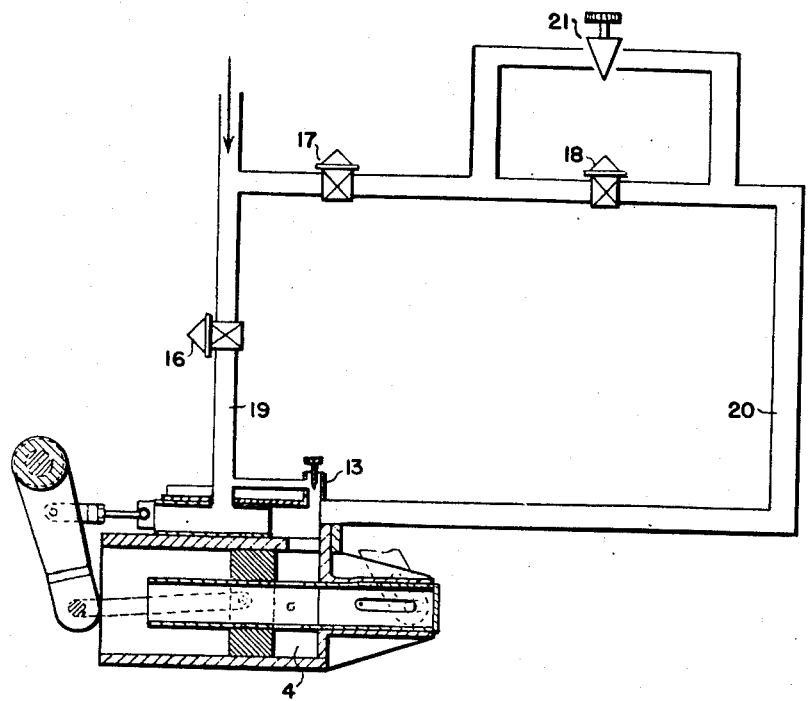
Fig. 2 shows diagrammatically one form of control system according to the invention.

Fig. 2 shows a more elaborate arrangement for controlling the flow of the pressure fluid. In this case during driving the valve 16 is held open and the valve 17 is held closed so that the pressure fluid flows to the servo operating mechanism as described with reference to Fig. 1. When braking, the valve 16 is closed and the valve 17 is opened The valve 18 is also normally open so that the pressure fluid instead of flowing through the pipe 19 to the servo-mechanism and through the valve 8, 9 or the valve 13 thereof, flows through the pipe 20 and is introduced to the main cylinder 4 of the mechanism conveniently through the plug 14 as described above. The valve 18 is so controlled that it closes when the current in the rotor circuit of the motor exceeds a predetermined value, in which case the pressure fluid has to pass through a valve 21 which is adjustable to provide a controlled flow of the pressure fluid at a suitable low rate.

Figures 3, 4:
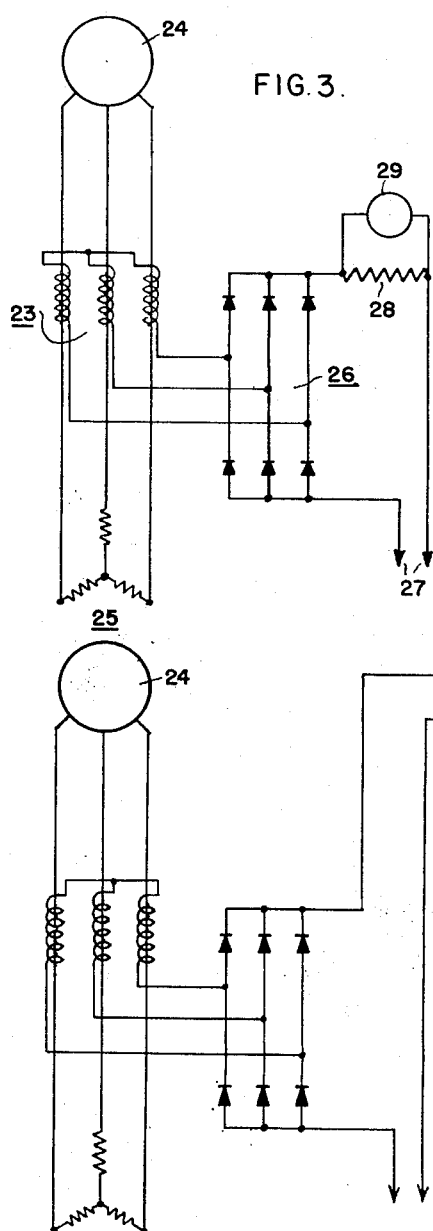
Figs. 3 and 4 show wiring diagrams of alternative forms of a control circuit.

Control of the valves of this arrangement is conveniently effected by means of the circuit arrangement shown in Fig. 3. Here the left-hand portion shows part of a conventional dynamic braking control circuit, current transformers 23 connected in the leads between the motor 24 and the load resistance (liquid controller) 25 providing an output, rectified by the three-phase rectifier 26, which is proportional to the load current. The output is applied over terminals 27, e. g. to control in known manner the output of an exciter supplying direct current to the stator of the motor 24. For the purpose of this invention, a resistance 28 is included in this circuit and the winding of a relay 29 is connected in shunt therewith. This relay is so arranged that when the current in the rotor circuit of the motor 24 reaches the peak, or any other predetermined value, it closes its contacts 30 which are arranged in the control circuit shown in the right-hand portion of this figure. The closing of the contacts 30 energises the contactor 31 which in turn closes its contacts 32 to energise the motor 33 controlling the valve 18 (Fig. 2). Accordingly, during dynamic braking as soon as the load current exceeds the predetermined value, the valve 18 will be closed to restrict the rate of flow of pressure fluid to the servo mechanism to that determined by the setting of the valve 21 The contacts 34 of the control circuit are closed by the action of the driver in changing over from driving to braking, and in so doing, act to energise the motors 35 and 36 which control the valves 16 and 17 respectively, the motor 35 when energised operating to close the valve 16 and the motor 36 operating to open the valve 17.

Fig. 4 shows an alternative form of electric control circuit in which a transductor or magnetic amplifier is used. In this arrangement the rectified load current is caused to flow through the D. C. winding 38 of the transductor which is also provided with an A. C. winding 39 arranged in series with the control coil of the relay 29, and the usual bias winding 40 and feedback winding 41. The direct current for the bias winding is shown as being obtained from a rectifier 42 connected across the A. C. supply to the control circuit but it may be obtained alternatively from a stabilised supply of direct current. The contacts 32 of the relay 29 control the motor 33 of the valve 18 as described above in connection with Figs. 2 and 3 and likewise the contacts 34 control the valves 16 and 17 Except for the use of the transductor, the arrangement of Fig. 4 is the same as that of Fig. 3, but the relay 29 may be much more robust in this later arrangement.

Inasmuch as during dynamic braking the stator current is a function of the rotor current, the relay 29 of Fig. 3 could equally well be energised through rectifier 26 associated through current transformers 23 with the stator circuit of the motor. Likewise, for the arrangement of Fig. 4, the D. C. winding 38 of the transductor could be arranged for energisation over rectifiers and current transformers associated with the stator circuit of the motor. Such energisation of the relay 29 (Figs. 3) or control winding 38 (Fig. 4) in accordance with the stator current will generally be more convenient.

Operation of the fluid valves 16, 17, and 18 of Fig. 2 is conveniently effected by means of solenoids, although other forms of electrically operated motorised valves may be used.

It will be appreciated that the particular form of servo mechanism described in connection with Fig. 1 is only given as an example to explain the operation of the invention, and that other suitable forms of position control servo mechanism may be used. In particular the return movement of the mechanism may be effected by gravity as in the described example or by pressure-operated means.

In each case the invention will ensure that when braking, even though the driver's lever is moved at once to the full "on" position, the mechanism will adjust the braking torque quickly to substantially the maximum value, whatever the speed of the winder or hoist may be, and will thereafter operate to vary this torque at a slower rate which may be substantially that which is required to maintain the desired torque as the winder or hoist slows down. Accordingly, the arrangement enables the driver to obtain complete control of the hoist and good manoeuvrability is afforded. In addition, suitable means may be provided which, when changing over from braking to driving, operate to remove the automatic control of the point at which the slower speed range of the servo mechanism is introduced and cause the slower speed range to be introduced at a particular value of the load resistance.

What we claim is:

1. A control system for electrically operated hoists and winders of the kind in which the speed of an alternating current driving motor is regulated by means of a liquid controller which is adjusted by positional control servo-mechanism in accordance with the setting of the driver's control lever, the servo-mechanism operating when driving to reduce the resistance of the controller rapidly to a value giving maximum driving torque and thereafter at a lower speed over the remaining part of the range, irrespective of the speed of movement of the driver's control lever, characterised by the provision of means for controlling the operation of the servo-mechanism in such manner that when braking the lower speed of operation is introduced when the rotor current (or the stator current) of the motor reaches a predetermined value.

2. A control system as claimed in claim 1, wherein means is provided for restricting the supply of pressure fluid to the servo-mechanism whenever the rotor (or stator) current reaches or exceeds the paid predetermined value.

3. A control system as claimed in claim 2, wherein the supply of pressure fluid is governed by an electrically operated valve which is controlled by a relay arranged in the rotor (or stator) circuit of the motor.

4. A control system as claimed in claim 2, wherein the supply of pressure fluid to the servo-mechanism is diverted through a bypass circuit when braking by the closing of a valve in the main circuit and the opening of a valve in the bypass circuit, the bypass circuit including a valve having an adjustable orifice and in shunt therewith an additional valve which is arranged to be closed when the rotor (or stator) current exceeds the said predetermined value.

5. A control system as claimed in claim 4, wherein the operation of the valves is effected by means of a relay which is operated from the rectified output of current transformers connected in the rotor (or stator) circuit of the motor.

6. A control system as claimed in claim 3, wherein the rectified output of current transformers arranged in the rotor (or stator) circuit is applied to a transductor or magnetic amplifier the output of which is arranged to operate the relay.

UNITED STATES PATENTS

| Number | Name | Date |
|---|---|---|
| 2,487,891 | Pinto | Nov. 15, 1949 |